United States Patent
Wang et al.

(10) Patent No.: US 10,270,702 B2
(45) Date of Patent: Apr. 23, 2019

(54) KIND OF TRANSMISSION METHOD BASED ON THE NETWORK LEARNABLE POWER MODEL

(71) Applicant: SICHUAN UNIVERSITY, Chengdu, Sichuan (CN)

(72) Inventors: Junfeng Wang, Chengdu (CN); Dong Liu, Chengdu (CN); Lixiang Liu, Chengdu (CN); Fuchun Sun, Chengdu (CN); Shiping Yang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 15/602,471

(22) Filed: May 23, 2017

(65) Prior Publication Data

US 2018/0013683 A1 Jan. 11, 2018

(30) Foreign Application Priority Data

Jul. 6, 2016 (CN) .......................... 2016 1 0526112

(51) Int. Cl.
*H04L 12/807* (2013.01)
*H04L 12/24* (2006.01)
*H04L 12/26* (2006.01)

(52) U.S. Cl.
CPC ............ *H04L 47/27* (2013.01); *H04L 41/145* (2013.01); *H04L 43/0864* (2013.01); *H04L 43/0888* (2013.01)

(58) Field of Classification Search
CPC ..................... H04L 47/27; H04L 43/0888
See application file for complete search history.

(56) References Cited

U.S. PATENT DOCUMENTS

| 7,406,093 | B2 * | 7/2008 | Furuyama | H04W 52/283 455/522 |
| 8,073,670 | B2 * | 12/2011 | Kimata | G06F 17/5031 703/19 |
| 8,347,189 | B2 * | 1/2013 | Ihara | H04L 1/0045 714/776 |
| 2012/0054533 | A1 * | 3/2012 | Shi | G06F 11/2094 714/4.1 |
| 2016/0234099 | A1 * | 8/2016 | Jiao | H04L 45/02 |
| 2017/0070547 | A1 * | 3/2017 | Falk | H04L 12/1881 |
| 2017/0353386 | A1 * | 12/2017 | Wang | H04L 43/0864 |
| 2018/0026898 | A1 * | 1/2018 | Lee | H04L 47/193 370/232 |

* cited by examiner

*Primary Examiner* — Parth Patel
(74) *Attorney, Agent, or Firm* — Oliff PLC

(57) ABSTRACT

A kind of transmission method based on the learnable power model, which conducts periodic record for the historical change trend of the network. This method conducts weighting smooth processing on the round trip time and judges the changing trend of congestion control window. Then, it establishes model for the relationship between network power and the congestion control widow. When a new ACK is received, it immediately updates the window of power model. Finally, it forecasts the size of the congestion control window of the next time period by combining the congestion window and the network power changing trend. For the network packet loss or time-out events, the retransmission mechanism of traditional TCP is used, and when the packet loss ends, the power model process is used again. This invention reduces the influence of the network random events of the estimation error of traditional algorithm.

11 Claims, 5 Drawing Sheets

KIND OF TRANSMISSION METHOD BASED ON THE NETWORK LEARNABLE POWER MODEL

TECHNOLOGY FIELD

This invention involves the end-to-end reliable transmission field of the Internet, which involves a kind of transmission method based on network learnable power model that specific to high bandwidth delay product networks.

BACKGROUND TECHNOLOGY

With the explosive growth of Internet broadband access and the increasingly diverse types of backbone links with long delays, it appears likely that new network protocols will continue to be developed to accommodate new network and application behaviors. With the quickly increasing growth of network bandwidth, satellite networks with large delay and wireless networks with multihops, backbone networks with the characteristics of high bandwidth and large delay are appeared in the internet, which forming the high bandwidth delay product (High Bandwidth Delay Product, HBDP) networks. Under the situation that the increasing of bandwidth and delay of uniflow, the effectiveness of the congestion control mechanism for the network transmission need to be guaranteed. The traditional protocol cannot satisfy the increasing transmission demand. Thus, according to the features of the high speed network, the high-efficiency transmission mechanism has become the key direction of the researches.

The researchers have put forward multiple kinds of improved acceleration transmission method of TCP and UDP. Therein, to solve the conservative additive increase multiplicative decrease strategy problem of TCP, the researchers adjust the congestion window program and protocol the improved new protocols based on TCP but different mechanisms are adopted for them, which include HighSpeed TC, Scalable TCP, Fast TCP, BIC, CUIBIC and HTCP. These algorithms make the increasing process of congestion window speed up through congestion control algorithm, which modifies the end system to obtain high throughput capacity. Consequently, the transmission performance of high speed network can be improved.

The window adjustment algorithm based on the improved protocol of TCP can be conclude as: when receive ACK feedback, $$W = W + \frac{f(x)}{W};$$

when packet loss events happened, $W=(1-g(x))\cdot W$. Therein, W refers to the congestion window size, $f(x)$ refers to the additive function adopted by the sending side when receiving ACK packet, $g(x)$ refers to the multiplicative function adopted when packet loss events occurs and the variable x refers to the implicit expression feedback factor may be selected by congestion adjustment function. Different feedback factors are selected according to the design of different $f(x)$ and $g(x)$.

The improved TCP designs different function changes through selecting the implicit expression feedback factor based on packet loss, time delay, or packet loss and time delay at the same time. Although the improved TCP has gotten certain bandwidth occupancy, this kind of mechanism which is based on the precise exploration of network situation is easily affected by the factors such as RTT change, multiple data traffic competition and background traffic, etc., which cannot obtain high bandwidth occupancy. Moreover, in the network with long delays, the unfairness of throughput capacity resulted by different RTT between the TCP is magnified, in which the problems such as the bandwidth distribution which cannot be convergent to the fairness or the unstable fairness. What's more, the packet loss recovery mechanism of TCP will result in the frequent shaking of TCP flow, making the queue buffer in the router unstable and reducing the transmission performance of high bandwidth delay product networks.

The TCP protocols based on the learnable characteristics such as the Remy algorithm which is proposed by Keith Winstein et al. uses the algorithm of offline automated learning to generate the congestion control algorithm that can maximize the expected value of target function through inputting all kinds of parameter models (such as the bottleneck link rate, time delay, the upper and lower bounds of multiplexing parameter, traffic model, network scenarios and so on). As the TCP has mechanism limitation itself and at the same time, this algorithm can only be used actually after the offline learning training is conducted. It cannot truly conduct perception on the network at real time, whose ease of use is relatively bad.

The reliable transmission methods are based on the UDP protocol including RUDP, RTP, UDT, Verus and etc., which are the protocols that conduct reliable control in the application layer. RUDP offers a group of data service quality strengthening mechanism such as improving of congestion control, retransmission mechanism, desalination server algorithm and son on. RUDP uses the retransmission mechanism and congestion control algorithm which are similar to that of TCP; RTP protocol can serialize the packets but the RTP does not offer any mechanism to confirm the timely transmission or offer guarantee for other service quality (Quality of Service, QoS) itself; UDT combines the rate control and window (traffic) control, in which the former adjusts the period of transmission of the packets and the later limits the maximum packets which do not obtain the response and the parameters used in the rate control are updated through bandwidth evaluation technology. This method is still based on the precise exploration on the network situation, which has the same problems as that of precise exploration on the network situation to TCP. Verus protocol adjusts the window through establishing the model during short period for the relationship between the time delay and the window instead of conducting precise exploration on the network status, which is applicable for the environment which cannot accurately control and explore the network status (such as unstable delay) but is not good as UDT in the aspect of bandwidth utilization.

Invention Content

This invention aims to solve the technical problem which offers a kind of transmission method based on the learnable power model (hereafter referred to as Hita protocol) to satisfy the high speed and reliable transmission demand in the high speed network.

To solve the technical problem mentioned above, the technical program adopted by this invention is:

A kind of transmission method based on the learnable power efficiency model, which includes the steps as follows:

Step 1: Record the round trip time vector of all ACK packets received $\vec{D}_i$ and the sending window vector $\vec{W}_i$, in which i means the current time period. Adopt the formula $D_{g,i}=\alpha \cdot D_{g,i-1}+(1-\alpha)\cdot \vec{D}_i$ to conduct weighting smooth processing on the round trip time vector $\vec{D}_i$. Therein, i−1 refers to the last time period, α is the weighting smooth factor and $D_{g,i}$ is the round trip time of maximum delay of ith time period after smoothing;

Step 2: Calculate the normalized time delay change rate $G_i$ in accordance with the formula $$G_i = \left(\frac{D_{g,i}-D_{g,i-1}}{D_{g,i}+D_{g,i-1}}\right)\left(\frac{W_{g,i}+W_{g,i-1}}{W_{g,i}-W_{g,i-1}}\right).$$

Therein, $W_{g,i}$ is the window size of the maximum time delay value of the ith time period;

Step 3: Calculate the network power estimation value $E_{e,i}$ in accordance with the formula $$E_{e,i} = \frac{T_i^\Delta}{D_i}.$$

Δ refers to the sensitive factor of delay-throughput and $T_i$ refers to the actual throughput of the ith time period, which are gotten through accumulation of the confirmed send window vector $\vec{W}_i$ in each time period. $D_i$ refers to all elements in the round trip time vector $\vec{D}_i$ of the i time period;

Step 4: Establish the corresponding relationship model between the corresponding network power capacity E of every data packet and the send window size W, which is defined as $W(x+1)=f(E(x)+\gamma(x))$. Therein, x is the time change parameter, i.e. time period i. $W(x+1)$ is the congestion control window size of the next time period, f(x) is the window control function, E(x) is the estimation function of network power and γ(x) is the increase and decrease size of network power;

Step 5: Judge the changing trend of network status. When $G_i>0$ or $$\frac{D_{max,i}}{D_{min}} > R,$$

the network becomes congestion and the network power should correspondingly decrease in the next time period. When $G_i \le 0$ and $$\frac{D_{max,i}}{D_{min}} > R,$$

network becomes free and the network power should correspondingly increase in the next time period, which is $$E_{e,i+1} = \begin{cases} E_{e,i} - \gamma_2 & \text{When } \frac{D_{max,i}}{D_{min}} > R \\ E_{e,i} - \gamma_1 & \text{When } G_i > 0 \\ E_{e,i} + \gamma_2 & \text{Otherwise} \end{cases}$$

in detail; $E_{e,i+1}$ is the network power estimation value of the i+1 time period, $D_{max,i}$ is the maximum element in the round trip time vector $\vec{D}_i$ of i time period, $D_{min}$ is the minimum element in the round trip time vector $\vec{D}_i$ and R is the maximum value of the link tolerance; $\gamma_1$ and $\gamma_2$ refer to the increase and decrease value of the network power. Through a large quantity of repeated experiments, the optimum values are selected;

Step 6: Calculate the $W_{i+1}$ window value according to Step 4 and Step 5;

Step 7: Divide every time period into n time slots. Every time slot is ms. After the i time period, the data sent within n−1 time slots is taken as a part of data to $W_{i+1}$. For instance, first n−1 time slots in every time period are used for the learnable model and the last time slot is used to send the remaining data. So the size of the data which shall be sent of the last time slot of the $W_{i+1}$ window is $W_{fin,i+1}$ and $$W_{fin,i+1} = \max\left[0, \left(W_{i+1} - \frac{n-2}{n-1} \cdot W_i\right)\right].$$

According to the program mentioned above, in Step 1, the value of α is 0.875. According to the program mentioned above, the model W(x+1) is learned and gotten by adoption of the linear regression algorithm in the machine learning algorithm. The input parameters are the corresponding network carrying capacity E of every data packet and the send window size W of the i time period.

According to the program mentioned above, the value of $\gamma_1$ is 2 ms and the value of $\gamma_2$ is 3 ms.

According to the program mentioned above, every time slot length λ is 5 ms.

$$n = \left\lceil \frac{\vec{D}_{ave}}{\lambda} \right\rceil,$$

in which $\vec{D}_{ave}$ refers to the mean value of all elements in the round trip time vector $\vec{D}_i$.

According to the program mentioned above, if the network packet loss or time-out issue occurs, the multiplicative reduction mechanism with β as the multiplicative factor shall be conducted, i.e. $W_{i+1}=\beta \cdot W_i$, in which β is the multiplicative reduction factor. And conduct the retransmission mechanism of the data packets to the traditional TCP. At this time, the window increases in the way of plusing 1.

According to the program mentioned above, the value of β is 0.7.

Being compared with the current technology, the beneficial effects of this invention are: 1) It has the feature of rapid convergence. Being compared with the traditional reliable transmission protocol, this invention follows the network status change through constantly learning of the feedback ACK within a certain time period, records the relationship between network energy efficiency and the window and establishes the model. Through this way, it can forecasts the dynamic change of the network and quickly adjust the window size of congestion control protocol. 2) Through adjusting the parameters which affect the delay and throughput in the model, this invention can make tradeoff between delay and throughput. In high speed networks, it can get closed to the best link bandwidth occupancy with lower end-to-end delay. The relatively traditional TCP or the reliable transmission protocol based on UCP has higher bandwidth occupancy rate and reduces the end-to-end delay of the transmission experience to the data packets at the same time. 3) This invention only needs to modify the end-to-end protocol of the application layer without the intermediate router or the network for configuration assistant. The proposed protocol is convention and easy to used and is also easy to be integrated into all kinds of application layer protocols based on the reliable transmission.

FIGURE EXPLANATION

SPECIFIC EXECUTION METHOD

Figure 1:
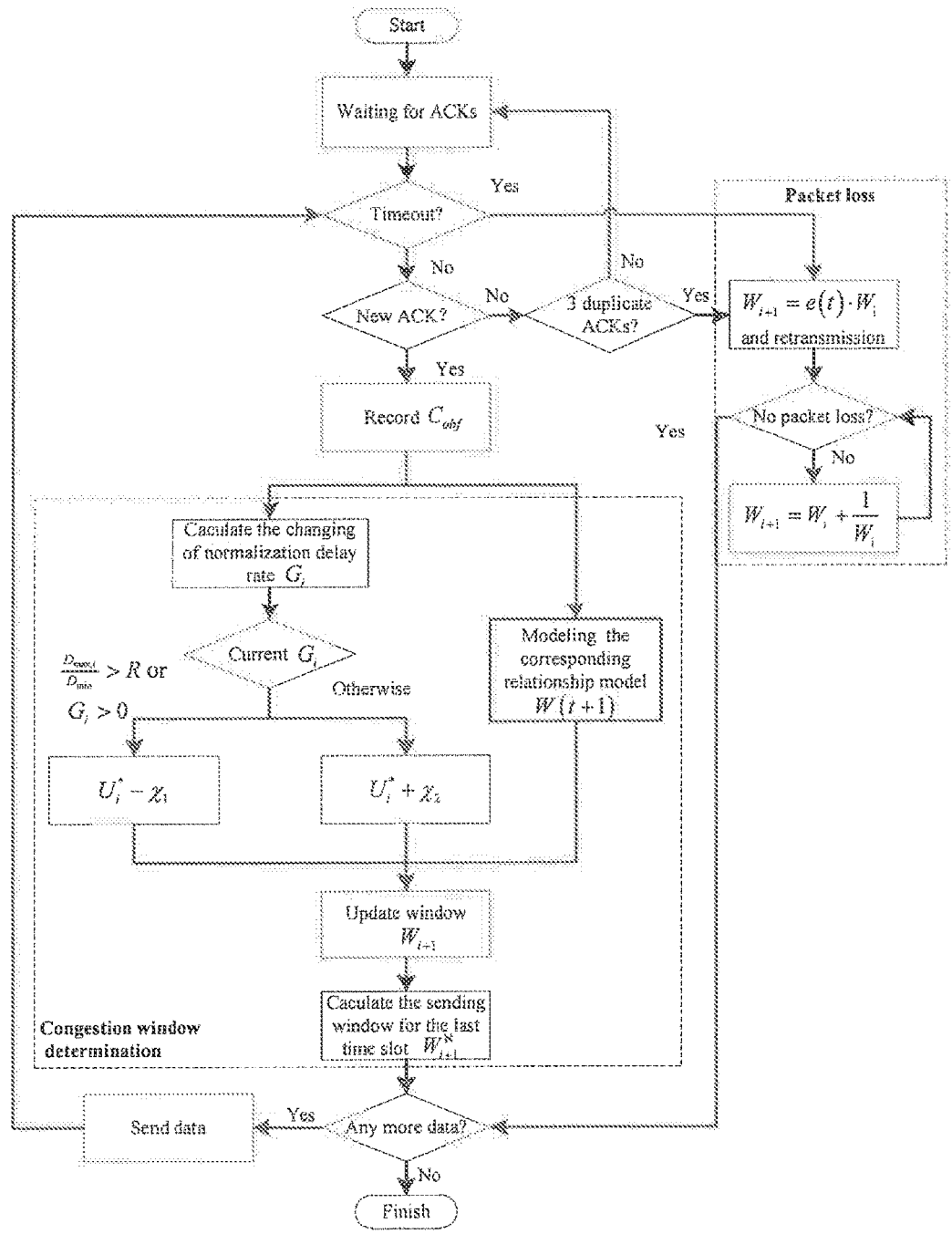
FIG. 1 shows the flow Figure for the transmission method based on learnable power efficiency model.

Further specific specification is given as follows by combining the attached Figures and the implementation case in detail. This invention offers a kind of transmission method based on learnable power efficiency model, which includes the steps as follows:

Step 1: Record the round trip time vector of all ACK packets received $\vec{D}_i$ and the sending window vector $\vec{W}_i$, in which i means the current time period. Adopt the formula $D_{g,i} = \alpha \cdot D_{g,i-1} + (1-\alpha) \cdot \vec{D}_i$ to conduct weighting smooth processing on the round trip time vector $\vec{D}_i$. Therein, i−1 refers to the last time period, α is the weighting smooth factor and $D_{g,i}$ is the round trip time of maximum delay of ith time period after smoothing;

Step 2: Calculate the normalized time delay change rate $G_i$ in accordance with the formula $$G_i = \left(\frac{D_{g,i} - D_{g,i-1}}{D_{g,i} + D_{g,i-1}}\right)\left(\frac{W_{g,i} + W_{g,i-1}}{W_{g,i} - W_{g,i-1}}\right).$$

Therein, $W_{g,i}$ is the window size of the maximum time delay value of the ith time period;

Step 3: Calculate the network power estimation value $E_{e,i}$ in accordance with the formula $$E_{e,i} = \frac{T_i^\Delta}{D_i},$$

Δ refers to the sensitive factor of delay-throughput and $T_i$ refers to the actual throughput of the ith time period, which are gotten through accumulation of the confirmed send window vector $\vec{W}_i$ in each time period. $D_i$ refers to all elements in the round trip time vector $\vec{D}_i$ of the i time period;

Step 4: Establish the corresponding relationship model between the corresponding network power capacity E of every data packet and the send window size W, which is defined as $W(x+1)=f(E(x)+\gamma(x))$. Therein, x is the time change parameter, i.e. time period i. $W(x+1)$ is the congestion control window size of the next time period, f(x) is the window control function, E(x) is the estimation function of network power and γ(x) is the increase and decrease size of network power;

Step 5: Judge the changing trend of network status. When $G_i>0$ or $$\frac{D_{max,i}}{D_{min}} > R,$$

the network becomes congestion and the network power should correspondingly decrease in the next time period. When $G_i \leq 0$ and $$\frac{D_{max,i}}{D_{min}} > R,$$

network becomes free and the network power should correspondingly increase in the next time period, which is $$E_{e,i+1} = \begin{cases} E_{e,i} - \gamma_2 & \text{When } \frac{D_{max,i}}{D_{min}} > R \\ E_{e,i} - \gamma_1 & \text{When } G_i > 0 \\ E_{e,i} + \gamma_2 & \text{Otherwise} \end{cases}$$

in detail; $E_{e,i+1}$ is the network power estimation value of the i+1 time period, $D_{max,i}$ is the maximum element in the round trip time vector $\vec{D}_i$ of i time period, $D_{min}$ is the minimum element in the round trip time vector $\vec{D}_i$ and R is the maximum value of the link tolerance; $\gamma_1$ and $\gamma_2$ refer to the increase and decrease value of the network power. Through a large quantity of repeated experiments, the optimum values are selected;

Step 6: Calculate the $W_{i+1}$ window value according to Step 4 and Step 5;

Step 7: Divide every time period into n time slots. Every time slot is λ ms. After the i time period, the data sent within n−1 time slots is taken as a part of data to $W_{i+1}$. For instance, first n−1 time slots in every time period are used for the learnable model and the last time slot is used to send the remaining data. So the size of the data which shall be sent of the last time slot of the $W_{i+1}$ window is $W_{fin,i+1}$ and $$W_{fin,i+1} = \max\left[0, \left(W_{i+1} - \frac{n-2}{n-1} \cdot W_i\right)\right].$$

In Step 1, the value of α is 0.875. In addition, the model $W(x+1)$ is learned and gotten by adoption of the linear regression algorithm in the machine learning algorithm. The input parameters are the corresponding network carrying capacity E of every data packet and the send window size W of the i time period.

In this invention, the value of $\gamma_1$ is 2 ms and the value of $\gamma_2$ is 3 ms. Every time slot length $\Delta$ is 5 ms.

$$n = \left\lceil \frac{\overline{D}_{ave}}{\lambda} \right\rceil,$$

in which $\vec{D}_{ave}$ refers to the mean value of all elements in the round trip time vector $\vec{D}_1$.

Further, if the network packet loss or time-out issue occurs, the multiplicative reduction mechanism with $\beta$ as the multiplicative factor shall be conducted, i.e. $W_{i+1} = \beta \cdot W_i$, in which $\beta$ is the multiplicative reduction factor. And conduct the retransmission mechanism of the data packets to the traditional TCP. At this time, the window increases in the way of plusing 1. For specific, the value of $\beta$ is 0.7.

Further specification is given for this invention through FIG. 2 to FIG. 9.

Figure 2:
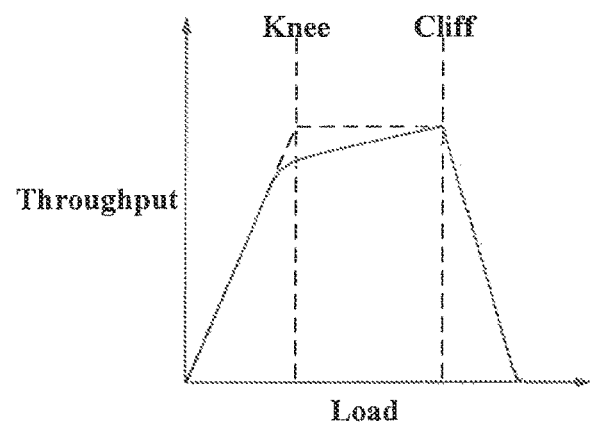
FIG. 2 shows the function relationship Figure between network throughput capacity and the load.
Figure 3:
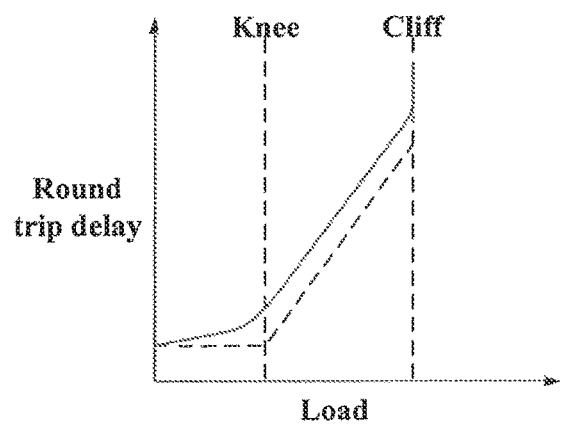
FIG. 3 shows the function relationship Figure between data packet round trip time and the load.
Figure 4:
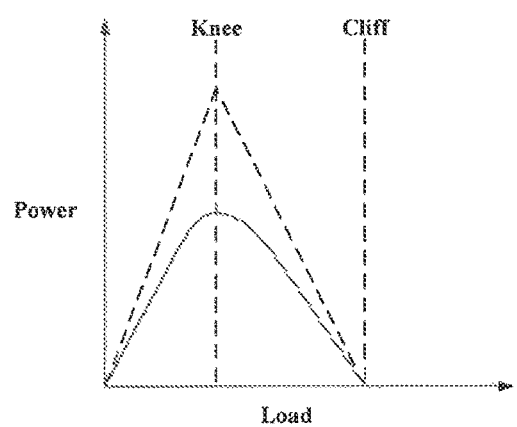
FIG. 4 shows the unction relationship Figure between the network energy efficiency and the load.

As shown in FIG. 2 and FIG. 3, when the load is relatively small, the increase of throughput capacity has linear relationship when being compared with the load and the delay increases slowly. When the load exceeds Knee point, the throughput capacity increases slowly and the delay increases quickly. When the load exceeds Cliff point, the throughput capacity decreases sharply and the delay increases sharply. From FIG. 3, we can see that when the load is near the Knee point, the use efficiency of the network is the highest. Congestion control means that the network nodes take measures to prevent the happening of congestion or response to the happening of congestion. In FIG. 2, the load is made to be near the Knee point. Congestion control mainly considers about the network environment between the end nodes, making the load do not exceed the transmission ability of the network. The flow control is implemented at the receiver side, making the sending rate of the sending end do not exceed the receiving ability of the receiving end.

Figure 5:
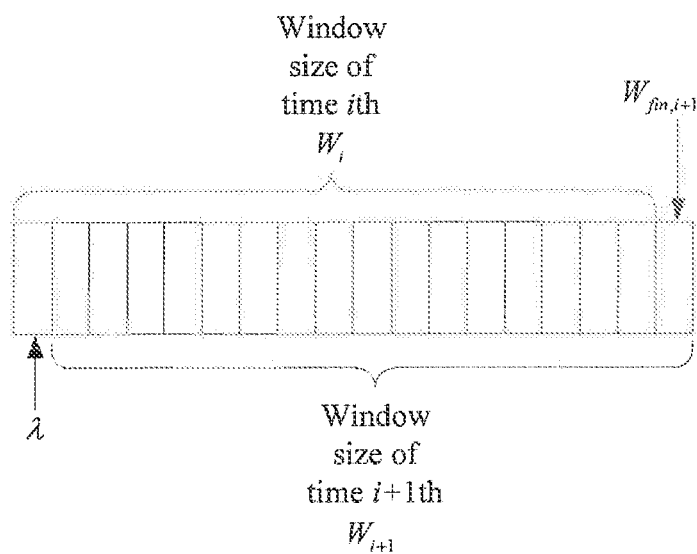
FIG. 5 shows the relationship Figure between the time and the window in Hita protocol.

As shown in FIG. 5, to reflect the change features of the channel quickly according to the information obtained through learning, Hita protocol subdivides the sending window $W_i$ into the smaller time slot of fixed length. After the i time period, the data sent within n−1 time slots serves as partial data of $W_{i+1}$ as well. Size of the data which shall be sent in the last one time slot of $W_{i+1}$ is $W_{fin,i+1}$. The sending window value $W_{i+1}$ is evaluated by using average RTT. Table 1 shows all parameters of the experimental test scenarios of SIIN satellite simulation platform of the Chinese Academy of Sciences, in which 10 kinds of satellite network topology structures are measured and the nodes include LEO, GEO satellite and the ground station.

TABLE 1

The Link Parameters for the Communication Scenarios of Different Satellites

| Measurement node | | No. | Distance between nodes(Km) | End-to-end RTT average value/Maximum value (ms) | Bit error rate | 2BDP set in node buffer (bytes) |
|---|---|---|---|---|---|---|
| Node types of satellites that the transmission passing by | LEO-LEO | Topology 1 | 7819.14 | 52 | 8.26E−07 | 1300000 |
| | | Topology 2 | 6732.45 | 44 | 6.25E−07 | 1100000 |
| | | Topology 3 | 5984.51 | 38 | 4.71E−07 | 950000 |
| | | Topology 4 | Uplink: 5984.51 | 76 | 4.71E−07 | 1900000 |
| | | | Downlink: 5984.51 | | 4.71E−07 | |
| | | Topology 5 | 5609.56 | 60 | 4.71E−07 | 1500000 |
| | GEO | Topology 6 | 15165.73 | 100 | 3.87E−06 | 2500000 |
| | | Topology 7 | 25914.00 | 170 | 9.74E−06 | 4250000 |
| | GND-LEO-GND | Topology 8 | Uplink: 3628.95 | 35 | 1.41E−07 | 875000 |
| | | | Downlink: 2005.36 | | 2.68E−08 | |
| | GND-LEO | Topology 9 | 2319.14 | 25 | 2.68E−08 | 625000 |
| | LEO-GEO | Topology 10 | 35100.82 | 250 | 1.85E−05 | 6250000 |

Table 2 shows the link models of different nodes tested through the simulation platform. The models in Table 2 are used to calculate the parameter information of the inter satellite links.

TABLE 2

Link Models of Different Types of Nodes

| | Transmission node type | | | | |
|---|---|---|---|---|---|
| | LEO-LEO | GEO-GEO | LEO-GEO | LEO-GND | GEO-GND |
| Working frequency | 10 | 10 | 10 | 10 | 10 |
| Transmitting power | 20 | 20 | 20 | 20 | 20 |
| Transmission gain of transmitting antenna | 26 | 27 | 29 | 32 | 33 |
| Transmission gain of receiving antenna | 54 | 54 | 54 | 54 | 54 |
| Receiver GT | 18 | 18 | 18 | 18 | 18 |

TABLE 2-continued

Link Models of Different Types of Nodes

| | Transmission node type | | | | |
|---|---|---|---|---|---|
| | LEO-LEO | GEO-GEO | LEO-GEO | LEO-GND | GEO-GND |
| Signal bandwidth | 24 | 24 | 24 | 24 | 24 |
| Assignment of bit error rate | −1 | −1 | — | — | — |
| Assignment of uplink bit error rate | — | — | −1 | −1 | −1 |
| Assignment of downlink bit error rate | — | — | −1 | −1 | −1 |
| Channel number | | "Convolutional K = 7 r = ½" | | | |
| Interlacing method | "Matrix" | "Matrix" | "Matrix" | "Matrix" | "Random" |
| Modulation method | "DBPSK" | "BPSK" | "BPSK" | "BPSK" | "BPSK" |

Figure 6:
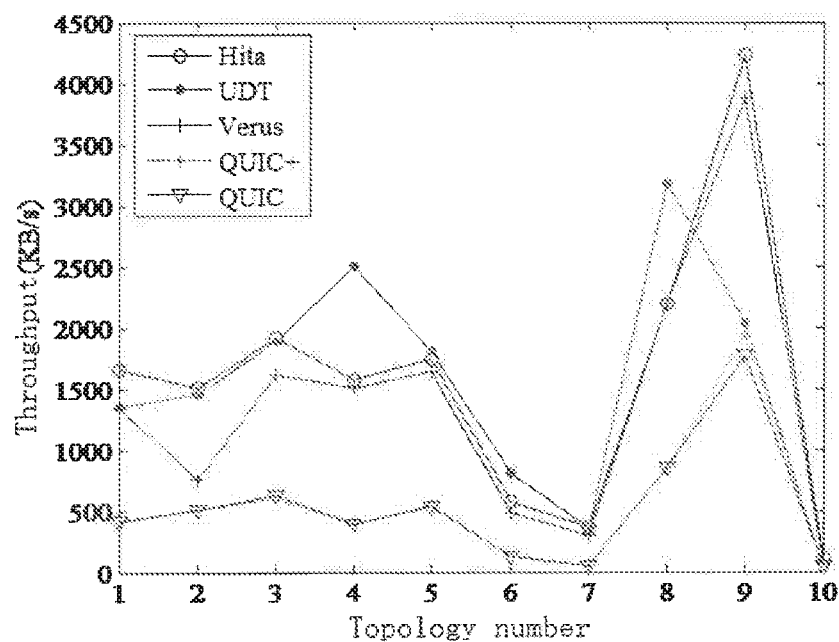
FIG. 6 shows the comparison Figure of average throughput capacity of Hita protocol and that of the reliable transmission protocol based on UDP.
Figure 7:
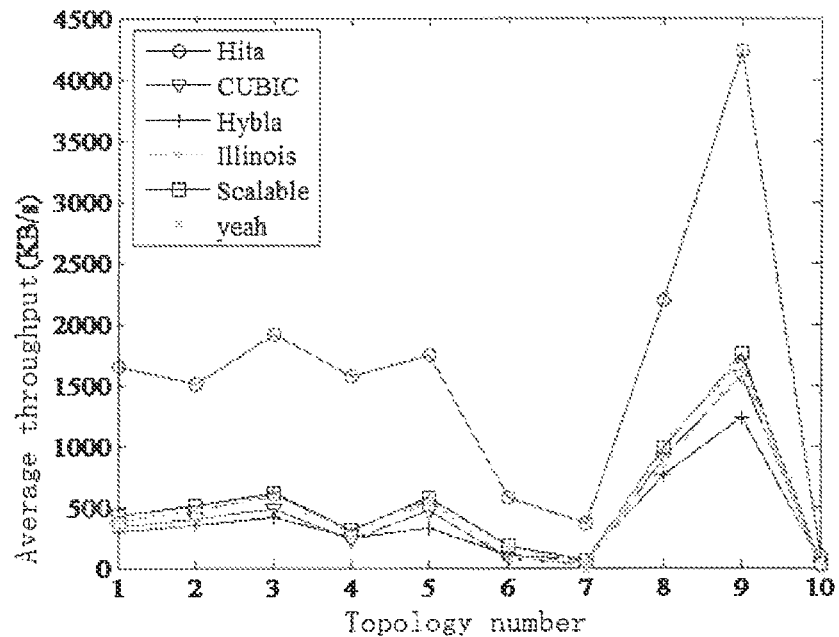
FIG. 7 shows the comparison Figure of average throughput capacity of Hita protocol and that of the TCP protocol with better performance in HBDP network.

FIG. 6 shows the comparison Figure of average throughput capacity of Hita protocol and that of the reliable transmission protocol based on UDP, from which we can see that in most situations, the average throughput capacity of Hita protocol is higher than that of other protocols, whose highest increasing range reaches 5.94 times as that of QUIC+ protocol and reaches 2.03 times as that of UDT protocol. Combining the fairness index in Table 3 and the stability index in Table 4, although the throughput capacity of Hita protocol is lower than that of UDT protocol in some scenarios, it has good fairness and stability. The index value for fairness and stability of UDT protocol is far lower than that of Hita protocol. FIG. 7 shows the comparison Figure of average throughput capacity of Hita protocol with TCP protocol with better performance, from which we can see that the average throughput capacity of Hita protocol is far higher than that all kinds of variable protocols of TCP protocol, whose lowest increasing range is 1.17 times as that of other protocols and the highest one reaches 12.55 times.

TABLE 3

Comparison of Fairness Index of Hita Protocol and the Reliable Transmission Protocol Based on UDP

| Protocol name | Index value of fairness (FI) |
|---|---|
| Hita | 0.99 |
| UDT | 0.71 |
| Verus | 0.98 |
| QUIC+ | 0.99 |
| QUIC | 0.99 |

TABLE 4

Comparison of Stability Index of Hita Protocol and the Reliable Transmission Protocol Based on UDP

| | Index value of stability (SI) Topology | |
|---|---|---|
| Protocol name | Tp-5 | Tp-10 |
| Hita | 0.02 | 0.14 |
| UDT | 0.49 | 0.51 |
| Verus | 0.37 | 0.17 |
| QUIC+ | 0.36 | 0.16 |
| QUIC | 0.39 | 0.17 |

Figure 8:
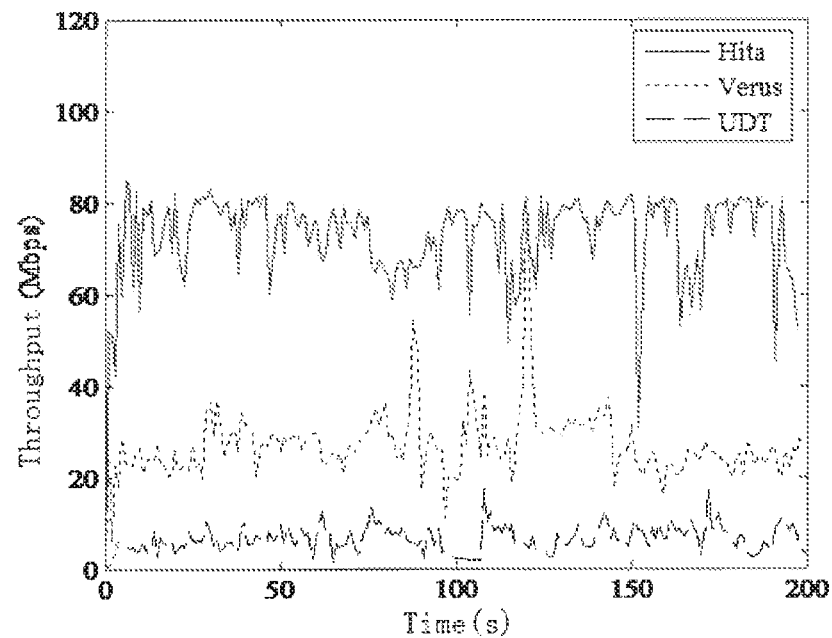
FIG. 8 shows the comparison Figure of actual throughput capacity of Hita protocol and that of the reliable transmission protocol based on UDP.
Figure 9:
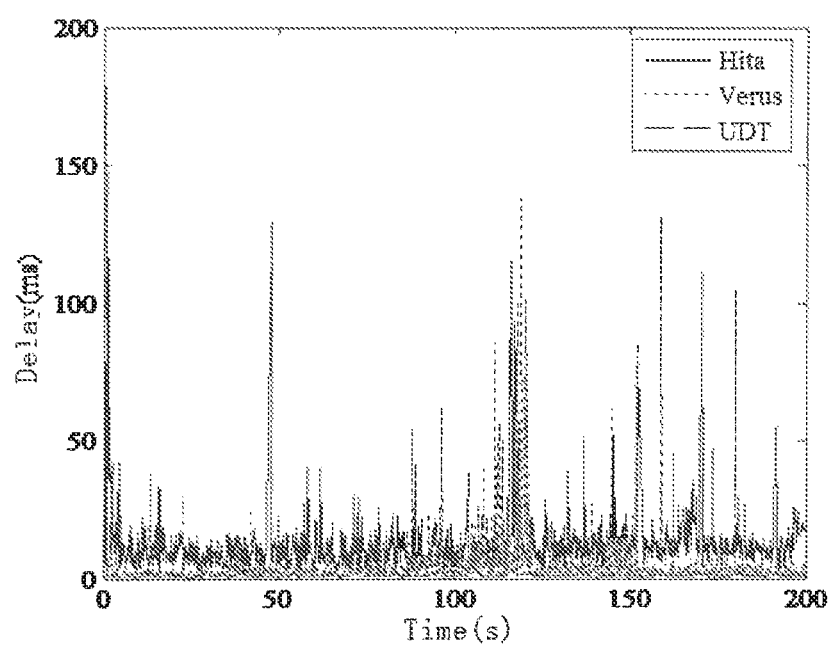
FIG. 9 shows the comparison Figure of real time end-to-end time delay of Hita protocol and that of the reliable transmission protocol based on UDP.

From FIG. 8, we can see that the actual throughput capacity of Hita protocol is far higher than that of other protocols. The occupies of Hita is about 80% of the link bandwidth while that of Verus occupies about 30% and that of UDP protocol occupies lower than 10%. From FIG. 9, it can be seen that Hita protocol can maintain the relatively low end-to-end time delay of about 10 ms.

The invention claimed is:
1. A network transmission method based on a learnable power efficiency model, the method comprising the following steps:
step 1: record a round trip time vector $\vec{D}_i$ for all ACK packets received and a congestion control send window vector $\vec{W}_i$, in which i means a current time period, and adopt the formula $D_{g,i} = \alpha \cdot D_{g,i-1} + (1-\alpha) \cdot \vec{D}_i$ to conduct weighting smoothing processing on the round trip time vector $\vec{D}_i$; wherein, i−1 refers to a last time period preceding the current time period, $\alpha$ is a weighting smoothing factor, and $D_{g,i}$ is a round trip time of maximum delay of an ith time period after smoothing;
step 2: calculate a normalized time delay change rate $G_i$ in accordance with the formula

$$G_i = \left(\frac{D_{g,i} - D_{g,i-1}}{D_{g,i} + D_{g,i-1}}\right)\left(\frac{W_{g,i} + W_{g,i-1}}{W_{g,i} - W_{g,i-1}}\right);$$

wherein, $W_{g,i}$ is the congestion control send window size of a maximum time delay value of the ith time period;
step 3: calculate a network power estimation value $E_{e,i}$ in accordance with the formula $$E_{e,i} = \frac{T_i^\Delta}{D_i},$$

wherein $\Delta$ refers to a sensitive factor of delay-throughput and $T_i$ refers to an actual throughput of the ith time period obtained through accumulation of the confirmed congestion control send window vector $\vec{W}_i$ in each time period, and $D_i$ refers to all elements in the round trip time vector $\vec{D}_i$ of the ith time period;
step 4: establish a corresponding relationship model between a corresponding network power capacity E of every data packet and the congestion control send window size W, which is defined as $W(x+1)=f(E(x)+\gamma(x))$; wherein, x is a time change parameter including the time period i, W(x+1) is the congestion control send window size of a next time period following the current time period, f(x) is a congestion control send window control function, E(x) is an estimation function of network power, and γ(x) is the increase and decrease size of the network power;

step 5: judge a changing trend of network status such that, when $G_i > 0$ or $$\frac{D_{max,i}}{D_{min}} > R,$$

the network is judged as congested and the network power correspondingly decreases in the next time period, and such that, when $G_i \leq 0$ and $$\frac{D_{max,i}}{D_{min}} > R,$$

the network is judged as not congested and the network power correspondingly increases in the next time period according to the formula $$E_{e,i+1} = \begin{cases} E_{e,i} - \gamma_2 & \text{When } \frac{D_{max,i}}{D_{min}} > R \\ E_{e,i} - \gamma_1 & \text{When } G_i > 0 \\ E_{e,i} + \gamma_2 & \text{Otherwise} \end{cases}$$

in detail; wherein $E_{e,i+1}$ is the network power estimation value of the i+1th time period which is the next time period, $D_{max,i}$ is a maximum element in the round trip time vector $\vec{D}_i$ of the ith time period, $D_{min}$ is a minimum element in the round trip time vector $\vec{D}_i$, and R is a maximum value of link tolerance, and $\gamma_1$ and $\gamma_2$ refer to the increase and decrease value of the network power;

step 6: calculate the $W_{i+1}$ congestion control send window value according to Step 4 and Step 5;

step 7: divide every time period into n time slots with every time slot being λ ms; after the ith time period, data sent within n−1 time slots is taken as a part of data in the $W_{i+1}$ congestion control send window, such that the n−1 time slots in every time period are used in the learnable power efficiency model and the nth time slot, which is the last time slot, is used to send the remaining data, such that a size of the data sent in the last time slot of the $W_{i+1}$ congestion control send window is $W_{fin,i+1}$ according to the following formula:

$$W_{fin,i+1} = \max\left[0, \left(W_{i+1} - \frac{n-2}{n-1} \cdot W_i\right)\right].$$

2. The network transmission method according to claim 1, wherein
the value of α is 0.875 in Step 1.

3. The network transmission method according to claim 2, wherein
if network packet loss or a time-out issue occurs, a multiplicative reduction with β as the multiplicative reduction factor is conducted, wherein $W_{i+1} = \beta \cdot W_i$, and retransmission of the data packets is conducted by traditional transmission control protocol (TCP), such that the congestion control send window increases by 1.

4. The network transmission method according to claim 1, wherein
the model W(x+1) is obtained by a linear regression algorithm in a machine learning algorithm, and input parameters of the model are the corresponding network carrying capacity E of every data packet and the congestion control send window size W of the ith time period.

5. The network transmission method according to claim 4, wherein
if network packet loss or a time-out issue occurs, a multiplicative reduction with β as the multiplicative reduction factor is conducted, wherein $W_{i+1} = \beta \cdot W_i$, and retransmission of the data packets is conducted by traditional transmission control protocol (TCP), such that the congestion control send window increases by 1.

6. The network transmission method according to claim 1, wherein
the value of $\gamma_1$ is 2 ms and the value of $\gamma_2$ is 3 ms.

7. The network transmission method according to claim 6, wherein
if network packet loss or a time-out issue occurs, a multiplicative reduction with β as the multiplicative reduction factor is conducted, wherein $W_{i+1} = \beta \cdot W_i$, and retransmission of the data packets is conducted by traditional transmission control protocol (TCP), such that the congestion control send window increases by 1.

8. The network transmission method according to claim 1, wherein
every time slot length λ is 5 ms, and $$n = \left\lceil \frac{\vec{D}_{ave}}{\lambda} \right\rceil,$$

in which $\vec{D}_{ave}$ refers to the mean value of all elements in the round trip time vector $\vec{D}_i$.

9. The network transmission method according to claim 8, wherein
if network packet loss or a time-out issue occurs, a multiplicative reduction with β as the multiplicative reduction factor is conducted, wherein $W_{i+1} = \beta \cdot W_i$, and retransmission of the data packets is conducted by traditional transmission control protocol (TCP), such that the congestion control send window increases by 1.

10. The network transmission method according to claim 1, wherein
if network packet loss or a time-out issue occurs, a multiplicative reduction with β as the multiplicative reduction factor is conducted, wherein $W_{i\pm 1} = \beta \cdot W_i$, and retransmission of the data packets is conducted by traditional transmission control protocol (TCP), such that the congestion control send window increases by 1.

11. The network transmission method according to claim 10, wherein
the value of β is 0.7.

* * * * *